United States Patent [19]

Oulman

[11] 4,188,742
[45] Feb. 19, 1980

[54] ROD HOLDER HAVING FISH ACTIVATED HOOK SETTING MECHANISM

[76] Inventor: Stanley R. Oulman, 8608 E. Pecos La., Scottsdale, Ariz. 85253

[21] Appl. No.: 899,278

[22] Filed: Apr. 24, 1978

[51] Int. Cl.² .......................................... A01K 91/06
[52] U.S. Cl. .................................................... 43/15
[58] Field of Search ............................. 43/15, 16, 21.2

[56] References Cited

U.S. PATENT DOCUMENTS

| | | | |
|---|---|---|---|
| 1,488,838 | 4/1924 | Savoie | 43/15 |
| 1,957,853 | 5/1934 | Sibley | 43/15 |
| 2,494,800 | 1/1950 | Finley | 43/15 |
| 2,744,351 | 5/1956 | Smith | 43/16 |
| 2,784,517 | 3/1957 | Mooney | 43/16 |
| 2,821,041 | 1/1958 | Hughes | 43/16 |
| 2,835,065 | 5/1958 | Schwartzkopf | 43/15 |
| 3,837,109 | 9/1974 | DeJulio | 43/15 |
| 3,897,646 | 8/1975 | Sheets | 43/15 |

*Primary Examiner*—Nicholas P. Godici

[57] ABSTRACT

The fishing aid mechanism for holding a fishing rod and automatically setting a hook in a fish includes base and arm members with a pivotal fastener or hinge therebetween. The rod holder is affixed to the arm member. A spring extends between the base and arm members. A releasable interlock has one mating portion on the arm and another mating portion on the base so that the arm and base are interlockable in one position under tension by the spring but release each other in response to relative movement therebetween caused by a force exerted by the rod on the rod holder. After release, the arm abruptly moves the rod holder and rod to another position to automatically set the hook in a fish.

15 Claims, 4 Drawing Figures

ROD HOLDER HAVING FISH ACTIVATED HOOK SETTING MECHANISM

BACKGROUND OF THE INVENTION

1. Field of the Invention

The present invention generally relates to mechanisms for holding and moving rods or poles and more particularly to fishing aid mechanisms which will hold a fishing rod or pole and operate the same to set a hook in response to a pull on a fishing line associated with the rod or pole.

2. Prior Art

There are a plurality of apparatuses presently available to aid those who fish to enjoy their sport. Some such apparatuses are comprised of a rod or pole holding portion and a spike for being driven into the ground, for instance. Others include a rod holding portion and a clamp for affixing the apparatus to a boat or dock, for instance. In using such apparatuses the fisher generally uses the rod to cast the bait and then places the rod in the holder. The fisher then attempts to observe the rod at all times. If the rod twitches or otherwise moves in a manner to indicate that a fish is attempting to take the bait, then the fisher removes the rod and attempts to hook the fish.

Generally there are problems with the foregoing approach. One problem is that a fish may take the bait while the fisher's attention is directed other than at the rod. As a result the fisher is unaware that a strike has occurred and makes no attempt to catch the fish. To solve this problem, prior art fishing aids sometimes include mechanisms which sense rod or pole movement and activate a visual alarm such as either a light or a flag. Moreover such mechanisms sometimes activate an audible alarm such as a buzzer to attract the attention of the fisher. The pole movement sensor may include an electrical contact switch which is directly operated by the pole and connected in a series circuit with a battery and the alarm. Such electrical or electronic mechanisms are disadvantageous because the batteries thereof must be checked and replaced. Alternatively, the pole movement sensor and alarm may be entirely mechanical in nature.

The above described alarmed pole attracts the fisher's attention in response to a strike provided that sufficient pole movement occurs to operate the alarm. However, another problem is that even though the fisher's attention is directed to the rod which is moved by a fish strike, the fish may free itself or lose interest in the bait before the fisher can remove the pole and set the hook.

An additional prior art mechanism, which is generally useful only for ice fishing, includes a vertical post having a horizontal, cantilevered bar extending laterally therefrom. A springable rod member has an initial portion extending from the post above and at an angle to the bar. The rod member further has a loop formed at an extreme end thereof such that the intermediate portion of the springable rod member can be arched between the post and the free end of the bar with the loop of the rod encircling the free end of the bar. A hook member is affixed to the loop. A free running spool having fishing line wound thereon is also attached to the post. The fishing line passes through a solid ring encircling the hook member and continues down through an opening in the ice into the water. The bait is affixed to the extreme end of the fishing line.

In operation, when a fish pulls on the line in a certain manner, the ring pulls on the hook member and removes the loop in the rod from the end of the bar. As a result, the spring action of the rod causes the extreme end of the rod to move to a higher elevation in response to the straightening out of the previously arched rod. Consequently, the rod jerks the line and hopefully sets the hook in the fish. A flag may be attached to the rod so that the position of the rod can be visually determined from a distance.

Although the foregoing ice fishing mechanism may be useful for some applications, it has a plurality of disadvantages. For example, its usefulness is generally limited to ice fishing. Since the prior art ice fishing mechanism is attached to a post it is difficult to move from one place to another. Also the mechanism is large and cumbersome and not easily attached to a boat. The unlatching mechanism for freeing the rod from the bar is somewhat unreliable and not capable of adjustment for different fishing situations. Furthermore, the free running spool provides virtually no control over the line being unwound by the fish. In addition, the ice fishing mechanism is not capable of being used with either a standard fishing pole or fishing rod and reel arrangement.

SUMMARY OF THE INVENTION

Accordingly, one object of the invention is to provide a fishing rod or fishing pole holding mechanism having an automatic fish activated hook setting capability which can be used at many places including a boat, a dock and a shoreline.

Another object of the invention is to provide a fishing rod holding mechanism having a fish activated hook setting capability which is reliable, inexpensive, mass producible and which can be adjusted to accommodate different types of poles or rods and reels and different kinds of fishing situations.

Still another object of the invention is to provide a fishing rod holding mechanism having a fish activated hook setting capability which is entirely mechanical and doesn't require batteries for the basic operation thereof.

A further object of the invention is to provide a mechanism for holding a conventional fishing rod with a reel attached thereto, setting a hook in response to movement of the pole by a fish, and allowing the drag mechanism of the reel to control the fish until the fisher can remove the pole from the mechanism.

In brief, the fishing aid mechanism of one embodiment includes a base member and an arm member having a pole holder affixed thereto. A pivotal fastener attaches the base member to one end of the arm member and a spring is arranged to operate between the base and arm members. A releasable interlock includes a first mating portion affixed to the arm and a second mating portion affixed to the base. The mating portions are arranged to interlock with each other and hold the base and arm members in a first predetermined or cocked position against a force created or generated by the spring. The mating portions release each other in response to movement of the arm relative to said base to allow the spring to abruptly move the arm to another predetermined or released position.

DETAILED DESCRIPTION OF THE PREFERRED EMBODIMENT

Figure 1:
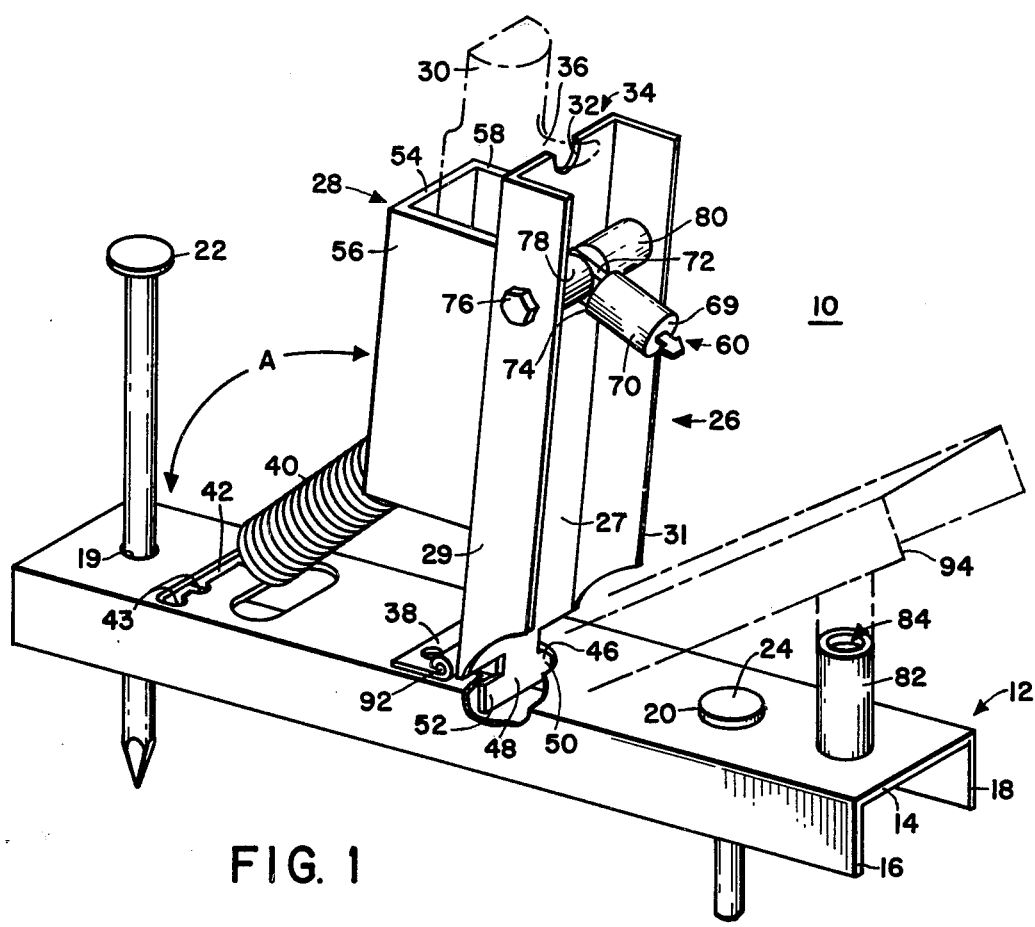
FIG. 1 is a front, isometric view of the fishing aid mechanism of one embodiment.

FIG. 1 is an isometric front view of fishing aid 10 of one embodiment which includes a base member 12 formed from a piece of aluminum channel, for instance; having a horizontal portion 14 which is integral with or affixed to two vertical portions 16 and 18. Each of portions 14, 16, and 18 of base member 12 are planar with a rectangular configuration. Horizontal portion 14 includes two holes 19 and 20 through which fasteners such as nails 22 and 24 can extend. Such fasteners can be used to directly anchor member 12 to a boat, the ground or a dock, for instance. Alternatively, base member 12 could be fastened to or made integrally with a clamp or a spike.

Arm member 26 also can be formed from a piece of aluminum channel having a first portion 27 situated in a first plane and second 29 and third 31 portions lying in a second plane which is substantially perpendicular to said first plane. Each of said portions of said arm member being planar with rectangular configurations. A pole holder 28, which also can be made of aluminum, of rectangular cross-section is affixed to or integral with arm member 26 for surrounding and restraining handle 30 of a conventional fishing pole or rod. Holder 28 also can have a circular cross-section. Notch 32 is provided in end 34 of portion 27 arm member 26 to accommodate trigger 36 of fishing pole handle 30. Pivotal fastener or hinge 38 is attached between and mechanically couples arm member 26 to portion 14 of base member 12. Coil spring 40 extends between slot 42 having notches 43 of base member 12 and arm member 26 as shown in detail in FIG. 3. Slot 42 and notches 43 extend through portion 14.

Spring 40 holds arm member 26 in the predetermined released position as shown by solid lines in FIG. 1. Restraining member 48 extends through another slot 46 which has an oval shape in portion 14 and includes shoulder tabs 50 (hidden) and 52. Tabs 50 and 52 press against the inner or bottom side of portion 14 to keep or restrain arm 26 from being pulled back too far toward base 12 by coil spring 40. It is desirable that arm 26 hold the rod attached to handle 30 slightly forward when in the released position. More particularly, the angle A between pole holder portion 54 and base portion 14 can be on the order of about 95°, for instance, when arm 26 is in the released position. Pole holder 28 also includes rectangular planar portions 56 and 58 which are affixed or integral with portion 54 but lie in a plane which is perpendicular to the plane of portion 54. The plane of rod holder portion 54 is parallel to the plane of arm portion 27. Portions 54, 56, and 58 of pole holder 28 can each be of a rectangular configuration.

Figure 2:
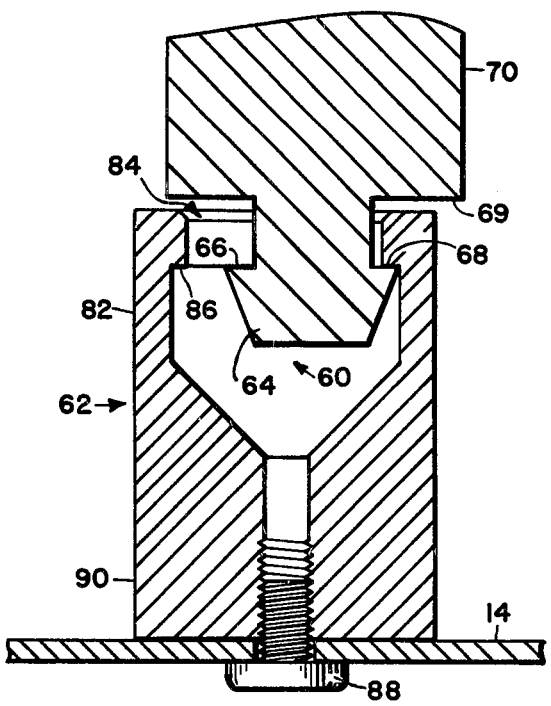
FIG. 2 is a sectional view of the lock down and trigger or release portions of the fishing aid mechanism of FIG. 1.

The releasable interlock of fishing aid 10 includes a male portion 60 which is attached to arm 26 and a female portion 62 which is attached to base 12. Male portion 60 includes a tapered end 64 with shoulders 66 and 68 thereon, as shown in detail in FIG. 2. End 69 of cylindrical member 70 is attached to or integral with male portion 60. The diameter of the cross section of end 69 of cylindrical portion 70 is longer than the maximum distance between the outside edges of shoulders 66 and 68. Tab 72 is attached to end 74 of cylindrical portion 70. Bolt 76 passes through arm portion 29, cylindrical spacer 78, tab 72, another cylindrical spacer 80, and arm portion 31. A nut (not shown) can be threaded on the part of bolt 76 extending through portion 31 to hold parts 64, 70, 72, 78 and 80 to arm member 26.

Female mating portion 62 includes hollow cylinder 82 having an open end 84 for receiving male portion 64. A lateral protrusion 86, shown in FIG. 2 extends from the inner wall of cylinder 82 into partially closed end 84. Screw 88 passes through horizontal portion 14 of base 12 into threaded end 90 of cylinder 82.

Arm member 26 is rotated clockwise about the axis defined by pin 92 of hinge 38 which stretches coil spring 40. The rotation is continued until tapered portion 64 is inserted into end 84 of hollow cylinder 82 to cock the fishing aid. Since the diameter of cylinder 70, and thus the perimeter or circumference of cylinder 70, is greater than the diameter, perimeter and circumference of the opening or aperture in end 84 of cylinder 82, cylinder 70 cannot be inserted into end 84 and forms a mechanical stop when end 69 of cylinder 70 abuts against the top surface of lateral protrusion 86. Shoulder 66 or 68 is interlocked with protrusion 86 to hold arm 26 in a cocked predetermined position as indicated by the phantom lines of FIG. 1 with spring 40 in a stretched position.

Sufficient relative lateral movement of arm 26, caused by a fish moving handle 30 for instance, with respect to base portion 14 will unlock or release shoulder 66 or 68 from protrusion 86 thereby enabling spring 40 to jerk or abruptly move arm 26 back to the released position. The protrusion 86 can have a width of 1/32 of an inch or less resulting in a sensitive trigger mechanism. This movement has been found to result in setting the hook in fish in a high percentage of instances.

Figure 3:
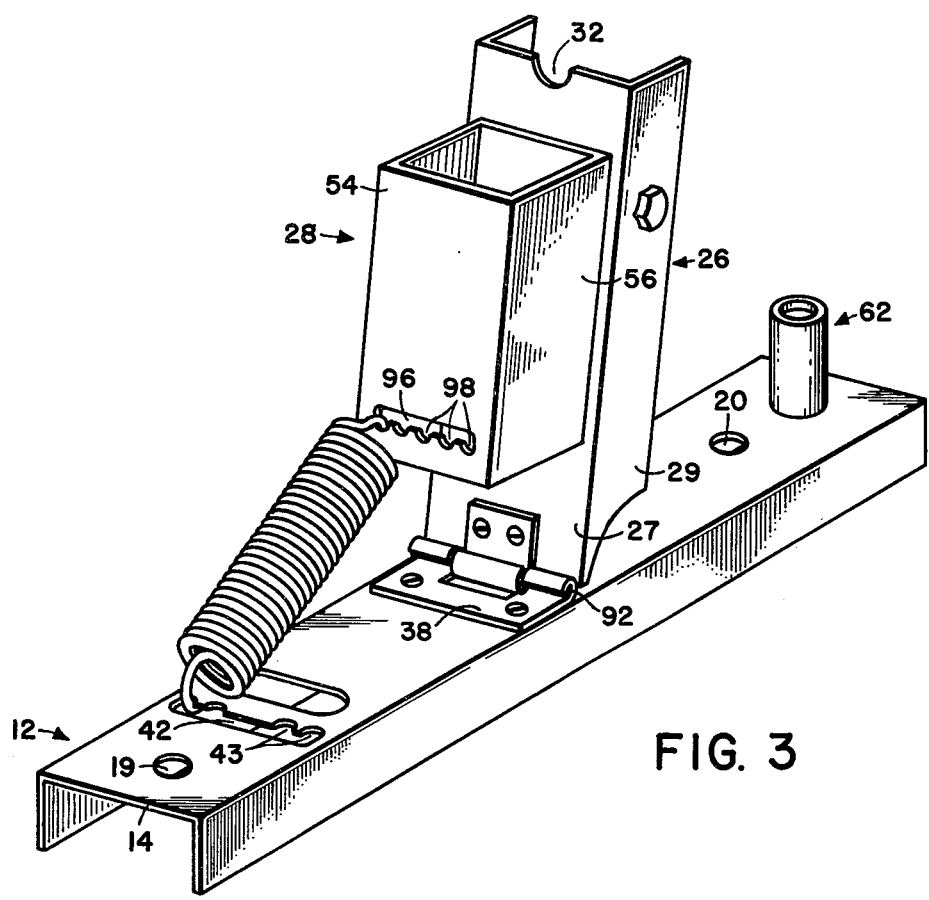
FIG. 3 is a back, isometric view of the fishing aid mechanism of FIG. 1 for illustrating the adjustable slot, notch and spring structure.

FIG. 3 illustrates that rear portion 54 of rod holder 28 has a slot 96 therethrough with a plurality of notches 98, such as five therein. Slot 96 runs generally parallel to slot 42 in base 12. If rod holder 28 is cylindrical rather than rectangular in cross section, then slot 96 and notches 98 can be provided in a tab attached to the hollow cylindrical rod holder, for instance. The notches in base portion 14 are in a left set and a right set. The fisher chooses one of these sets based on convenience of reach, for instance. The corresponding notch in slot 96 is chosen based on fishing conditions and the weight of the rod and reel. Generally the choice of notches at the edge of slots 96 and 42 tend to make it more difficult for the interlock mechanism to release and should be used either with heavier poles or if it is desired to only catch heavier fish.

Figure 4:
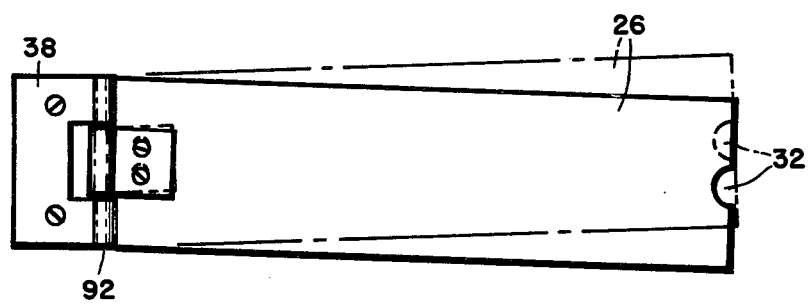
FIG. 4 is a top view of the arm member and the hinge of the fishing aid mechanism of FIG. 1 which illustrates the lateral play of the arm member.

FIG. 4 shows in solid lines the relative position of the parts of hinge 38 and arm 26 as male portion 69 is either being inserted into or released from opening 84 of female portion 62. The phantom lines show the relative positions of the parts of hinge 38 and arm 28 when male portion 69 is interlocked with female portion 68. Thus, it is necessary for hinge 38 to allow the necessary amount of relative lateral movement or play between arm 26 and base 12 to facilitate operation of the interlock and release mechanism. This movement is allowed by pin 92 being loosely fitted through the portions of hinge 38 which wrap around pin 92.

What has been described is a fishing rod mechanism having an automatic fish hooking capability and which can be used in many places including boats, docks and shorelines. The mechanism is reliable, inexpensive, simple enough to be advantageously made by mass production. The slots 42, 96 and notch 43, 98 mechanism respectively associated with base 12 and arm 28 facilitate adjustment of spring 40 to accommodate different types of rods and fishing situations. The mechanism 10 is entirely mechanical and requires no batteries. Rod holder 28 accommodates a variety of fishing rod and reel combinations. The drag mechanisms of such reels control a fish after mechanism 10 has automatically set the hook therein until the fisher can take the rod from holder 28 and land the fish.

I claim:

1. A fishing aid mechanism including in combination:
    a base member;
    an arm member having at least one end and a pole holding means;
    pivotal fastener means attaching said base member to said one end of said arm member;
    spring means extending between said base member and said arm member;
    releasable interlocking means having a first mating portion affixed to said arm member and a second mating portion affixed to said base member, one of said mating portions including a tapered end having at least one shoulder thereon, and said other mating portion including a wall having a lateral protrusion extending therefrom, said lateral protrusion being adapted to interlock with said shoulder to hold said arm member in a first predetermined position against a force generated by said spring means until said mating portions are moved laterally a sufficient distance relative to each other such that said mating portions are no longer interlocked, said mating portions releasing each other in response to said movement of said arm member relative to said base member to allow said spring means to abruptly move said arm member to another predetermined position; and
    said wall of said other mating portion surrounding an aperture of a first perimeter, and said one of said mating portions including a further portion of a second perimeter which has a length that is greater than said first perimeter so that said tapered end of said one of said mating portions can be inserted only a predetermined distance into said aperture.

2. The fishing aid mechanism of claim 1 wherein said base member includes:
    a horizontal portion;
    a first vertical portion affixed to said horizontal portion; and
    a second vertical portion affixed to said horizontal portion.

3. The fishing aid mechanism of claim 2 wherein each of said portions of said base member is planar with a rectangular configuration.

4. The fishing aid mechanism of claim 1 wherein:
    said arm member includes at least a first portion having one end positioned near said base member; and
    hinge means mechanically coupling said one end of said first portion of said arm member to said base member.

5. The fishing aid mechanism of claim 4 wherein said first portion of said arm member is situated in a first plane and said arm member further includes second and third portions affixed to said first portion, said second and third portions lying in a second plane which is substantially perpendicular to said first plane.

6. The fishing aid mechanism of claim 4 wherein said arm member further includes a member for restraining movement of said arm member with respect to said base member.

7. The fishing aid mechanism of claim 5 wherein said first, second and third portions of said arm member are each planar with substantially rectangular configurations.

8. The fishing aid mechanism of claim 1 wherein said arm member has a planar portion located in a first plane and said pole holding means includes:
    a first portion located in a plane which is parallel to said first plane; and
    second and third portions substantially located in a second plane which is perpendicular to said first plane such that said second and third portions extend between said first portion of said pole holding means and said planar portions of said arm member to form an enclosure for a pole.

9. The fishing aid mechanism of claim 1 wherein said spring means includes a coil spring having one end attached to said arm member and another end attached to said base member.

10. The fishing aid mechanism of claim 1 wherein said pivotal fastener means includes a hinge which allows sufficient relative lateral movement between said arm and base members to facilitate interlocking and releasing of said mating portions.

11. The fishing aid mechanism of claim 1 wherein:
    said base member includes a planar surface and a first slot with notches therein;
    said arm member includes a planar surface and a second slot with notches therein, said first and second slots running generally parallel to each other; and
    said spring means including a coil spring having one end positioned in said first slot so that said one end is restrained by a selected notch of said first slot, said coil spring having another end positioned in said second slot so that said other end of said coil spring is restrained by a selected notch in said second slot.

12. A fishing aid mechanism for holding a fishing rod and automatically setting a hook in response to a force exerted on the rod by a fish, including in combination:
    a base member;
    an arm member having at least one end and a rod holding means;
    a hinge means attaching said base member to said one end of said arm member, said hinge means allowing said arm member to rotate with respect to said base member;
    coil spring means extending between and mechanically intercoupling said base member and said arm member;
    releasable interlocking means having a first mating portion affixed to said arm member and a second mating portion affixed to said base member, said mating portions interlocking with each other to hold said base member and said arm member in one predetermined position against a force developed by said coil spring means, said mating portions releasing each other in response to movement caused by force exerted by the rod on said arm member relative to said base member to allow said spring means to abruptly move said arm member to another predetermined position to automatically set the hook; and said base member includes a planar surface and a first slot with notches therein, said arm member includes a planar surface and a second slot with notches therein, said first and second slots running generally parallel to each other, and said coil spring means has one end positioned in said first slot so that said one end is restrained by a selected notch of said first slot, said coil spring having another end positioned in said second slot so that said other end is restrained by a selected notch in said second slot to thereby control the magnitude of the force which must be exerted on the rod to cause said mating portions to release each other.

13. The fishing aid mechanism of claim 12 wherein: one of said mating portions includes a tapered end with a shoulder thereon; and said other mating portion includes a wall having a lateral protrusion extending therefrom, said lateral protrusion being adapted to interlock with said shoulder to hold said arm member in said first predetermined position until said mating portions are moved laterally a sufficient distance relative to each other such that said mating portions are no longer interlocked.

14. The fishing aid mechanism of claim 13 wherein: said wall of said other mating portion surrounds a circular aperture of a first circumference; and said one of said mating portions includes a further circular portion of a second circumference which has a length that is greater than said first circumference so that said tapered end of said one of said mating portions can be inserted only a predetermined distance into said aperture.

15. The fishing aid mechanism of claim 12 wherein said hinge means allows sufficient relative lateral movement between said arm member and said base member to facilitate interlocking and releasing of said mating portions.

* * * * *